United States Patent
DeMott

(10) Patent No.: US 6,294,486 B1
(45) Date of Patent: Sep. 25, 2001

(54) FORMALDEHYDE-FREE ADHENSION PROMOTER COMPOSITION FOR WAISTBAND FABRIC

(75) Inventor: Roy Phillip DeMott, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/395,033

(22) Filed: Sep. 13, 1999

(51) Int. Cl.[7] ........................................................ B32B 27/02
(52) U.S. Cl. ......................... 442/168; 442/85; 442/86; 428/293; 428/399
(58) Field of Search ....................... 428/293, 399; 442/85, 86, 168

(56) References Cited

U.S. PATENT DOCUMENTS

| | | | |
|---|---|---|---|
| 3,630,657 | * 12/1971 | Setzer | 8/115.5 |
| 3,642,563 | * 2/1972 | Davis et al. | 161/88 |
| 3,650,880 | 3/1972 | Tieniber | 161/89 |
| 3,775,205 | * 11/1973 | Mermann et al. | 156/72 |
| 4,284,682 | * 8/1981 | Tschirch et al. | 428/263 |
| 4,438,167 | 3/1984 | Schwarz | 428/138 |
| 4,539,255 | 9/1985 | Sato et al. | 428/258 |
| 4,761,324 | 8/1988 | Rautenberg et al. | 428/198 |
| 4,880,424 | 11/1989 | Rautenberg | 604/396 |
| 4,972,522 | 11/1990 | Rautenberg | 2/67 |
| 5,110,666 | * 5/1992 | Menzel et al. | 428/196 |
| 5,166,300 | * 11/1992 | Rumon et al. | 528/65 |
| 5,178,938 | * 1/1993 | Magistro et al. | 428/252 |
| 5,268,212 | 12/1993 | Lumb et al. | 428/96 |
| 5,298,303 | * 3/1994 | Kerr et al. | 428/35.7 |
| 5,380,578 | 1/1995 | Rautenberg | 428/172 |
| 5,510,142 | 4/1996 | Groshens | 427/176 |
| 5,523,351 | * 6/1996 | Colvin et al. | 525/124 |
| 5,592,690 | 1/1997 | Wu | 2/67 |
| 5,614,302 | 3/1997 | Nance, Jr. | 442/286 |
| 5,924,917 | * 7/1999 | Benedict et al. | 451/526 |
| 5,989,660 | * 11/1999 | Moriwaki et al. | 428/35.2 |

FOREIGN PATENT DOCUMENTS 4-139223 * 5/1992 (JP) ........................ B32B/27/12

* cited by examiner

Primary Examiner—Elizabeth M. Cole
Assistant Examiner—Arti Singh
(74) Attorney, Agent, or Firm—Terry T. Moyer; William S. Parks

(57) ABSTRACT

This invention relates to adhesion promotion compositions which provide excellent adhesive characteristics between rubber latices and flexible textile substrates. Such compositions comprise specific mixtures of capped isocyanates which react strongly and thoroughly with rubber latices to promote the adhesion of such latices to textile substrates. Such rubber latices provide the ability to increase the stretch characteristics of the target textile substrate while simultaneously permitting retention of a certain degree of rigidity. Such rubber/textile composites are useful within waistbands as they retain their stretch and rigidity very well even after repeated dry cleanings. The inventive adhesion promoter does not require the utilization of formaldehyde, reduces the amount of promoter needed to effectuate the proper adhesive characteristics, and substantially eliminates potential discolorations and swelling of the target textile substrate associated with standard formaldehyde-containing adhesion promoter compositions. The methods utilizing these particular adhesion promotion compositions as well as the target textile substrates themselves are also contemplated within this invention.

12 Claims, No Drawings

FORMALDEHYDE-FREE ADHESION PROMOTER COMPOSITION FOR WAISTBAND FABRIC

FIELD OF THE INVENTION

This invention relates to adhesion promotion compositions which provide excellent adhesive characteristics between rubber latices and flexible textile substrates. Such compositions comprise specific mixtures of capped isocyanates which react strongly and thoroughly with rubber latices to promote the adhesion of such latices to textile substrates. Such rubber latices provide the ability to increase the stretch characteristics of the target textile substrate while simultaneously permitting retention of a certain degree of rigidity. Such rubber/textile composites are useful within waistbands as they retain their stretch and rigidity very well even after repeated dry cleanings. The inventive adhesion promoter does not require the utilization of formaldehyde, reduces the amount of promoter needed to effectuate the proper adhesive characteristics, and substantially eliminates potential discolorations and swelling of the target textile substrate associated with standard formaldehyde-containing adhesion promoter compositions. The methods utilizing these particular adhesion promotion compositions as well as the target textile substrates themselves are also contemplated within this invention.

Discussion of the Prior Art

Waistband fabric has typically comprised a rubber latex/monofilament fabric composite which exhibits both flexibility (to permit stretching when worn) and the ability to retain its shape (to prevent any undesirable rolling and/or misshapening of the fabric). Such waistband fabric is incorporated within pants, slacks, and the like, and is covered by other fabrics (such as wool, polyester, cotton, and the like) which generally coordinate with the remaining fabric of the slacks, etc., and protect the waistband fabric. Such fabric has been utilized for many years in order to provide the wearer with comfortable apparel.

In the past, waistband articles were made from all-rubber compositions in order to provide stretch. However, roll-over of the waistband was common as there was little or no rigidity to keep the waistband from folding on itself. Such rubber articles did, however, include curing agents which provided durability during multiple drycleanings and washings. More recently, such waistband articles included carboxylated nitrile rubber latices including melamine formaldehyde curing agents.

Recently, it has been realized that adhering rubber latices to textiles, particularly those composed of filaments having high tenacity to a rubber latex, enhances the modulus of the textile, increases the tensile strength of the rubber component, and provides long-lasting durability for the entire composite. Thus, providing effective and proper adhesion between the textile and the rubber has been of utmost importance in such applications. Without any primer treatment, the textile will not effectively adhere to the rubber. A weak bond between the two components results in separation of the two layers. Thus, it has been and is necessary to provide a textile treatment to enhance the adhesion of these two layers of distinct components.

This combination of a monofilament (for rigidity and shape retention) and rubber latex (to provide stretch and flexibility) has required the utilization of certain adhesive compositions which effectuate the proper contact and bonding between these two necessary components. Further advancements in producing suitable waistband articles have included adhering carboxylated nitrile rubbers to textile backings through the utilization of melamine formaldehyde agents for adhesion promotion. Due to low cost and effective adhesion characteristics, such formaldehyde-containing adhesion promoters are and have been the standard compositions utilized for this purpose for years. Recently, however, there has been a move away from such potentially environmentally damaging, and alleged carcinogenic formaldehyde-containing compositions to more acceptable adhesion promoters. Furthermore, high curing temperatures are required to effectuate the production of the target rubber latex/monofilament textile composite; formaldehyde, however, is prone to discolor substrates to which it is applied under high temperatures. Again, this problem has driven the industry to find suitable substitutions for formaldehyde-containing adhesion promotion compositions.

Such a move has proven difficult, however, since compositions, such as melamine formaldehyde, provide not only beneficial adhesive characteristics between rubber latices and monofilament textiles, but such compounds also permit repeated and continuous drycleaning procedures without deleteriously affecting the waistband fabric composite [i.e., the melamine groups appear to prevent "swelling" (delaminating) of the latex from the fabric in the presence of standard drycleaning solvents]. Thus, the search for a replacement adhesion promoter has entailed more than finding a compound with similar adhesive properties as formaldehyde-containing compositions; the substitute must also prevent "swelling" of the latex and fabric during drycleaning procedures, must not cause discolorations of the fabric under high curing temperatures, and must also be a cost-effective alternative to such readily available, inexpensive formaldehyde-containing compositions. To date, the prior art has not accorded a specific, simple composition which provides all of these necessary benefits and/or characteristics.

DESCRIPTION OF THE INVENTION

It is thus an object of the invention to provide a formaldehyde-free adhesion promoter composition for the production of a rubber latex/textile composite. A further object of the invention is to provide a relatively inexpensive method of adhering a rubber latex and textile together without the utilization of a formaldehyde-containing adhesion promoter composition. Another object of the invention is to provide an adhesion promoter which does not exhibit discoloring of the target composite or components thereof during exposure to high curing temperatures. Yet another object of this invention is to provide a rubber latex/textile composite which does not deleterious react with standard dry cleaning solvents and which is also produced with a formaldehyde-free adhesion promoter composition.

Accordingly, this invention concerns a textile/rubber latex composite comprising a rubber latex and a textile fabric, wherein said rubber latex and said textile fabric are adhered together through the utilization of a formaldehyde-free adhesion promoter composition comprising at least one capped isocyanate compound. Furthermore, this composition also encompasses a method of producing a textile/rubber composite comprising the steps of (a) providing a rubber latex composition; (b) introducing an adhesion promoter composition into said rubber latex composition of step "a" wherein said adhesion promoter composition is free from formaldehyde and comprises at least one isocyanate compound; (c) applying the resultant composition of step "b" to a textile fabric substrate; and (d) curing the resultant textile/rubber latex/adhesion promoter composite at temperature of between about 280 and 400° F. Nowhere within the prior art has such a specific rubber latex/textile composite or method of making same been disclosed or practiced. Although capped isocyanates have proven useful in the past within and as adhesives, there is no teaching or fair suggestion that such compounds can suitably function as adhesion promoters for rubber latices and textiles, while simultaneously preventing textile, rubber, or composite discolorations due to high curing temperatures, providing the same "non-swelling" benefits in the presence of standard dry cleaning solvents as with melamine formaldehyde, for example, and reducing the amount of promoter composition necessary to effectuate a sufficient bonding between the target rubber latex and textile to ultimately produce a high modulus strength, high stretch, high shape retaining composite, thereby being extremely cost-effective to the user.

The term "capped isocyanates" is intended to encompass compounds including isocyanate moieties which are capped with certain groups, such as esters, ketones, ethers, carboxylic acids (which thus encompasses urethanes), and the like. Since isocyanates moieties are highly reactive when uncapped, it is necessary to provide such capped compounds prior to the initiation of curing of the target rubber latex and textile together. Thus, upon exposure to a high temperatures (such as those associated with curing of rubber, etc.), the cap (block) groups, such as esters, carboxylic acids, and the like, are removed (unblocked) from the base compound, leaving the isocyanate moieties free to react with both the rubber latex and textile components of the desired composite. Although any such capped compound possessing isocyanate compounds (which are not available for reaction until such cap groups are removed, typically through the exposure to heat), preferably the compound is a diisocyanate (i.e., having two potentially reactive isocyanate moieties); more preferably the compound is diphenylmethane-bis-4,4'-methyleketootim carbamate, available from Mitsubishi Chemical under the tradename Repearl® MF. Such a specific diisocyanate-based compound unblocks at a relatively low temperature (between about 280 and 395° F.), thereby removing the ester groups (carbamates), and thereby permitting crosslinking with the reactive groups (such as carboxyls, hydroxyls, and the like) of the rubber latex. Other compounds, such as, as merely one nonlimiting example, urethanes, including Witcobond® W-290H may also be utilized as the preferred capped isocyanates.

Such isocyanates cross-link easily together within the need for curing agents (or other cross-linking catalysts or promoters) thereby eliminating the need for the addition such compounds (although such agents, cross-linkers, etc., may be utilized if desired). Such self-cross-linking ultimately provides a rubber latex/textile composite which is impervious to deleterious moisture, solvents, and the like, such that washing and dry cleaning will not result in delamination of the latex from the textile. As noted above, water and/or certain dry cleaning solvents (perchloroethylene, and the like, for example) utilized within cleaning procedures have the ability, generally, to wear away adhesive contact sites between rubber and textile composite components. Such deleterious action (which is heretofore and generally known as "swelling") results in the delamination of the latex from the textile, thereby destroying the composite itself and eliminating the desired stretch, strength, and shape retention characteristics of the target waistband. Cross-linked adhesion promoters provide an excellent defense against such swelling. For example, melamine formaldehyde comprises melamine for the purpose of providing a cross-linked adhesive composition to act as a protectant for the interface between the rubber latex and textile against exposure of water and other solvents. The same protective ability is accorded the user through the utilization of capped isocyanates. Thus, the inventive composites and methods provide the same anti-swelling effects as the standard undesirable formaldehyde-containing adhesion promoters of the past.

The term "formaldehyde-free" is intended to encompass a composition which has less than 300 ppm of free formaldehyde. Since rubber latices generally include some amount of formaldehyde, the current aim has been to substantially reduce the amount of formaldehyde utilized within the entire composite. Because of the possibility of formaldehyde migrating from the rubber latex, particularly at elevated temperatures, there remains the potential for formaldehyde entering the adhesion promoter composition. However, not only does the utilization of a capped isocyanate not require the addition of any formaldehyde to effectuate proper adhesion, such a compound actually appears to react with any free formaldehyde within the rubber latex in such a manner as to significantly prevent the migration of such formaldehyde from the finished composite. Such reactions thus reduce significantly the amount of potential formaldehyde leached, removed, or otherwise from the rubber latex and into the environment. Hence, the utilization of a formaldehyde-free capped isocyanate adhesion promoter composition not only provides a procedure which eliminates the addition of formaldehyde from such rubber latex/textile composites, it actually appears to significantly reduce the amount of formaldehyde which can potentially enter the environment from the rubber latex itself. In fact, it appears that the higher the curing temperature, the greater the degree of cross-linking occurs, which thereby further reduces the potential for formaldehyde emission from the finished composite. This phenomenon has heretofore been unexplored and undisclosed and results in a significant advantage and advancement within this art.

The textile utilized within the inventive composite and method may be of any construction. Thus, synthetic, natural, glass, inorganic, etc., fibers, and any blends thereof, may constitute the selected textile component. Polyester, polyamide, cotton, wool, boron derivative fibers, and the like, are merely examples of such desirable textiles. Preferably, the textile is a synthetic (which is more conducive to producing strong composites with rubber latices and which are very capable of stretching and retaining their shape upon formation of such a rubber latex/textile composite); more preferably polyester or nylon or blends thereof The textile may comprise fibers of deniers from about 1 to about 1,000 denier, generally. Furthermore, the textile may be woven, knit, or non-woven; preferably, such a textile is woven having anywhere from 8 to about 70 picks/inch; preferably a nylon warp is utilized with a polyester fill, both having different denier fibers.

The rubber latex may be of any type which provides a degree of elongation to the target textile of greater than about 150%. Thus, latices comprising nitrile rubber, chlorinated rubber, butadiene rubber, ethylene-propylene-diene comonomer rubber, neoprene rubber, and the like may be utilized. Preferably, the rubber is a nitrile rubber which is carboxylated. Furthermore, it is preferred that the rubber latex comprises less than 300 ppm formaldehyde. Most rubber compositions are made through the addition of some type of formaldehyde, thus it is very difficult to utilize a rubber latex which is completely free of such an undesirable compound. As noted above, and extensively discussed, the inventive utilization of an isocyanate to cross-link such a rubber component also appears to react with and cross-link the available formaldehyde as well, "locking" such within the target composite.

The general procedure of this inventive method entails first shrinking the fabric (textile) under steam and coating the top surface with the desired rubber latex (including standard rubber additives, such as antioxidants, thickeners, fillers, opacifiers, and the like) mixed with the capped isocyanate, the entire formulation which possesses a relatively high viscosity (from about 10,000 to about 50,000 cps; preferably from about 15,000 to about 45,000; most preferably about 40,000 cps). The coated fabric is then carried in a relaxed state on a carrier fabric to an oven and dried to stabilize the fabric at a relatively high picks/inch count (which provides the shape retention). The product is then cured in a dryer at a temperature between about 300 and 400° F. for about 4 to about 10 minutes.

DETAILED DESCRIPTION OF THE PREFERRED EMBODIMENT

The Examples below are indicative of the particularly preferred embodiment within the scope of the present invention:

EXAMPLE 1

A fabric comprising textured nylon yarn (2-ply, 70 denier) in the warp direction and polyester fill yarns (400 denier) was woven to 22 picks/inch. The woven fabric web was then placed on a rubber conveyor belt and moved across a steam table continuously to permit exposure of each area of the web for about 15 to 20 seconds. Such a treatment shrank the fabric to about 34–35 picks/inch. It was then passed under a doctor blade, disposed at a gap between the blade and the surface at about 1 to 5 millimeters (to provide a very thin, 1 to 5 mm, coating on the fabric surface) which applied a coating composition comprising 89% by weight of the total composition of a carboxylated nitrile rubber latex (neoprene)(available from BFGoodrich under the trade designation MW-1448 which comprised the rubber latex, antioxidants to prevent yellowing, titanium dioxide, and calcium carbonate), about 6% by weight of Repearl® MF, and about 5% by weight of a WT-56 (a thickener available from BFGoodrich). This composition possessed a viscosity of about 40,000 cps which thus remained on the fabric surface upon coating. The coated fabric was then placed onto a carrier fabric, transported to an oven, and dried at a temperature of about 300° F. for 2.5 minutes in order to permanently shrink the fabric to about 33 picks/inch. The shrunk, coated fabric was then placed within a drum dryer and subsequently exposed to a curing temperature of about 380° C. for about 2 minutes.

EXAMPLE 2

The same method was followed as in EXAMPLE 1, except the coated, shrunk fabric was at a temperature of about 360° for about 2 minutes.

EXAMPLES 3–7

The following table represents the different textile/rubber latex composites formed with the same components and compositions of EXAMPLE 1, above, except the curing temperature and/or curing times were changed:

TABLE 1

| Example | Curing Temperature (° F.) | Curing Time (min) |
|---|---|---|
| 3 | 380 | 5 |
| 4 | 380 | 8 |
| 5 | 355 | 10 |
| 6 | 375 | 10 |
| 7 | 395 | 10 |

Each of the composites produced in accordance with these examples exhibited excellent elongation, shape retention, and strength. Furthermore, such composites withstood repeated washings and/or dry cleanings (up to 50) without any appreciable alteration of such properties. These composites were also analyzed for other characteristics, such as formaldehyde emission in accordance with AATCC Test Method 1 12-1984 with a chromotropic acid, discoloration (yellowing) of the fabric during curing (particularly when the fabric was kept stationary for about 1 minute within the curing oven; an empirical measurement for production of yellow colorations on the fabric), and "swelling" (possible delamination of the rubber latex from the textile) after 10 drycleanings (through the measurement of elongation; a relatively low increase over the initial elongation shows a favorable result). Such composites were also compared with standard composites produced with melamine formaldehyde-containing adhesion promoters, produced in the same manner as in EXAMPLE 1, above. Specific results were as follows:

TABLE 2

| Example | Formaldehyde Emissions | Discoloration? | % Elongation Initial | After 10 Cleanings |
|---|---|---|---|---|
| 1 | 302 ppm | No | * | * |
| 2 | * | No | 10.2% | 14.5% |
| 3 | 127 ppm | No | 9.3% | 12.9% |
| 4 | 161 ppm | No | * | * |
| 5 | * | No | * | * |
| 6 | * | No | * | * |
| 7 | * | No | * | * |
| Comparative | 492 ppm | Yes | 8.5% | 13.0% |

*These tests were not performed for such samples.

Clearly, in comparison with the standard composite then the inventive composite and method both provide an article which has substantially reduced formaldehyde emissions, shows no undesirable and aesthetically displeasing yellow discolorations, and shows similar, if not favorable elongation characteristics.

There are, of course, many alternative embodiments and modifications of the present invention which are intended to be included within the spirit and scope of the following claims.

What we claim is:

1. A textile/rubber latex composite comprising a rubber latex and a textile fabric, wherein said rubber latex and said textile fabric are adhered together through the utilization of a formaldehyde-free adhesion promoter composition comprising at least one capped isocyanate compound.

2. The composite of claim 1 wherein said capped isocyanate is a capped diisocyanate.

3. The composite of claim 1 wherein said rubber latex is a carboxylated nitrile rubber latex.

4. The composite of claim 1 wherein said textile fabric is selected from the group consisting of polyester, polyamide, and blends thereof.

5. The composite of claim 4 wherein said textile fabric is polyester.

6. A method of producing a textile/rubber composite comprising the steps of
   (a) providing a rubber latex composition;
   (b) introducing an adhesion promoter composition into said rubber latex composition of step "a" wherein said adhesion promoter composition is free from formaldehyde and comprises at least one isocyanate compound;
   (c) applying the resultant composition of step "b" to a textile fabric substrate; and
   (d) curing the resultant textile/rubber latex/adhesion promoter composite at temperature of between about 125 and 320° C.

7. The method of claim 6 wherein the said isocyanate is a diisocyanate.

8. The method of claim 6 wherein said rubber latex is a carboxylated nitrile rubber latex.

9. The method of claim 6 wherein said textile substrate is selected from the group consisting of polyester, polyamide, and blends thereof.

10. The method of claim 9 wherein the textile substrate is polyester.

11. The method of claim 6 wherein said curing temperature in step "d" is from about 320 to about 400° C.

12. The method of claim 11 wherein said curing temperature in step "d" is from about 330 to about 395° C.

* * * * *